United States Patent
Zhang et al.

(10) Patent No.: US 12,307,743 B2
(45) Date of Patent: May 20, 2025

(54) MULTISCALE POINT CLOUD CLASSIFICATION METHOD AND SYSTEM

(71) Applicant: NANJING UNIVERSITY OF POSTS AND TELECOMMUNICATIONS, Nanjing (CN)

(72) Inventors: Dengyin Zhang, Nanjing (CN); Rui Gong, Nanjing (CN); Yingying Cao, Nanjing (CN); Chen Yang, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 350 days.

(21) Appl. No.: 17/988,136

(22) Filed: Nov. 16, 2022

(65) Prior Publication Data

US 2023/0222768 A1    Jul. 13, 2023

Related U.S. Application Data

(63) Continuation of application No. PCT/CN2022/107283, filed on Jul. 22, 2022.

(30) Foreign Application Priority Data

Jan. 13, 2022    (CN) .......................... 202210038066.4

(51) Int. Cl.
*G06V 10/764*    (2022.01)
*G06V 10/77*    (2022.01)
*G06V 10/80*    (2022.01)
*G06V 10/82*    (2022.01)

(52) U.S. Cl.
CPC ........ *G06V 10/764* (2022.01); *G06V 10/7715* (2022.01); *G06V 10/809* (2022.01); *G06V 10/82* (2022.01)

(58) Field of Classification Search
None
See application file for complete search history.

(56) References Cited

U.S. PATENT DOCUMENTS 10,084,971 B2 * 9/2018 Liu .................... G01N 15/0227
11,210,803 B2 * 12/2021 Ye ........................... G06T 7/579
(Continued)

FOREIGN PATENT DOCUMENTS

CN    108399424 A    8/2018
CN    109426828 A    3/2019
(Continued)

*Primary Examiner* — Tahmina N Ansari
(74) *Attorney, Agent, or Firm* — Nitin Kaushik (57) ABSTRACT

The present disclosure discloses a multiscale point cloud classification method. The method includes the following steps: acquiring 3D unordered point cloud data; performing feature extraction and classification on the acquired point cloud data using a pre-trained parallel classification network to obtain an output result, wherein the parallel classification network includes a plurality of basic networks with the same structures; and fusing the output results of the parallel network using a pre-trained deep Q network to obtain a final result of point cloud classification. The present disclosure can improve the accuracy and robustness of point cloud classification.

6 Claims, 7 Drawing Sheets

1. Feature alignment
2. Feature extraction
3. Fully connected
4. Fusion
5. Classification result (56) References Cited

U.S. PATENT DOCUMENTS

| | | | | |
|---|---|---|---|---|
| 11,641,457 | B2* | 5/2023 | Yin | G06T 7/593 |
| | | | | 348/43 |
| 12,175,691 | B1* | 12/2024 | Jiao | G06T 7/344 |
| 2022/0182593 | A1* | 6/2022 | Yin | G06T 7/33 |
| 2022/0343553 | A1* | 10/2022 | Mashita | G06F 18/2413 |
| 2023/0083322 | A1* | 3/2023 | Isogawa | B66F 9/24 |
| | | | | 702/6 |
| 2023/0222768 | A1* | 7/2023 | Zhang | G06V 10/82 |
| | | | | 382/181 |

FOREIGN PATENT DOCUMENTS

| | | | | |
|---|---|---|---|---|
| CN | 110110621 | A | 8/2019 | |
| EP | 3535699 | A1 * | 9/2019 | G06F 17/16 |

* cited by examiner

1. Feature alignment
2. Feature extraction
3. Fully connected
4. Fusion
5. Classification result

FIG. 1

1. Feature alignment  2. Feature extraction

3. Fully connected

4. Classification result

MULTISCALE POINT CLOUD CLASSIFICATION METHOD AND SYSTEM

CROSS-REFERENCE TO RELATED APPLICATIONS

The application claims priority to Chinese patent application No. 202210038066.4, filed on Jan. 13, 2022, the entire contents of which are incorporated herein by reference.

TECHNICAL FIELD

The present disclosure relates to a multiscale point cloud classification method and system, and belongs to the technical field of computer 3D vision.

BACKGROUND

Compared with 2D vision, a 3D vision technology can acquire more abundant and comprehensive environmental information, and has become a key technology in face recognition, unmanned driving, enhanced/virtual reality, industrial detection and other fields. 3D vision technology can better overcome the problem that 2D images cannot reflect a real world. Coordinates in the point cloud format can reflect actual position information in the real world. Target recognition in a 3D space is a hot research topic at present, and the key of target recognition is target classification and segmentation. With the development of a data acquisition technology, more and more types of data acquisition methods are used, from pictures and 3D models. Point cloud is a main representation mode of 3D data. Original point cloud data can be directly collected through laser radar, depth sensor, and other sets of equipment. The point cloud can be widely used in various fields, such as virtual reality, 3D printing, unmanned driving, target classification and segmentation, and the like. Therefore, more and more scholars put a lot of work into the point cloud data processing.

Point cloud classification is similar to image classification, and a point cloud set is correctly recognized according to a corresponding label. Point cloud segmentation is to classify point cloud data according to the rules, which usually marks points with the same features as a category. Traditional methods generally classify and segment point cloud data by manually extracting features, but these methods rely on the professional skill and experience of people, so that the process is more complex, and these methods are only applicable to specific tasks. In order to improve the automation degree of the point cloud classification and segmentation, more and more methods use deep learning to replace traditional feature extraction methods. The depth learning method can extract high-dimensional features of input data according to a target to be learned. In recent years, a large number of researchers have applied the depth learning technology in the two-dimensional field to 3D unstructured point cloud data, which can be directly applied to unordered and sparse point cloud data. However, most methods only extract the global features of the point cloud, but ignores a local relationship between points, which leads to low accuracy and robustness of classification and segmentation. In addition, computation of deep learning is relatively complex and requires a lot of training time, which is not conducive to transferring a model to an actual application scenario. Therefore, it is of great practical significance to improve the accuracy of point cloud classification and training efficiency.

SUMMARY

The present disclosure aims to overcome the shortcomings in the prior art and provide a multiscale point cloud classification method and system, which can improve the accuracy and robustness of point cloud classification. In order to achieve the above objective, the present disclosure is implemented using the following technical solutions:

In a first aspect, the present disclosure provides a multiscale point cloud classification method, including:
- acquiring 3D unordered point cloud data;
- performing feature extraction and classification on the acquired point cloud data using a pre-trained parallel classification network, and obtaining an output result, wherein the parallel classification network includes a plurality of basic networks with the same structures; and
- fusing the output results of the parallel network using a pre-trained deep Q network to obtain a final result of point cloud classification.

In combination with the first aspect, further, there are five basic networks, and each basic network includes a feature alignment layer, a feature extraction layer and a fully connected layer.

In combination with the first aspect, further, the various basic networks are distinguished according to different feature dimensions of point clouds input into the basic networks, and the dimensions of features output by different layers in the same basic network are the same.

In combination with the first aspect, further, the obtaining an output result includes:
- performing feature alignment on the point clouds by means of the feature alignment layer according to point cloud data of n×3;
- after a convolution operation is performed on the aligned point cloud data of n×3 for three times through the feature extraction layer, outputting features with dimensions of n×128, n×256, n×512, n×1024 and n×2048;
- after max-pooling operation, solving a maximum value at the second dimension, and outputting global features with dimensions of 1×128, 1×256, 1×512, 1×1024 and 1×2048; and
- performing processing through the fully connected layer, and obtaining scores of k categories with a size of N×k as the output results of the basic networks, N being a batch size.

In combination with the first aspect, further, the performing, by the feature extraction layer, feature extraction using a feature pyramid network includes:
- extracting features according to an order from low dimensions to high dimensions, performing double upsampling and addition on the extracted features in order from low dimensions to high dimensions, and outputting features with corresponding feature dimensions.

In combination with the first aspect, further, the various basic networks that constitute the parallel network are trained using a loss function, and the loss function is expressed by the following formula:

$$l(\theta) = -\sum_{i=1}^{m} \log(P_G(x^i; \theta)) \qquad (1)$$

in formula (1), $x^i$ represents a sample; m represents the number of training samples; and $P_G(x^i; \theta)$ represents each sample data distribution model decided by parameter $\theta$.

In combination with the first aspect, preferably, a dataset for training the basic networks is a ModelNet40 training sample of Stanford University.

In combination with the first aspect, further, a dataset for training the deep Q network is an object category with the best classification result achieved by manually labeling each basic model.

In a second aspect, the present disclosure provides a multiscale point cloud classification system, including:
- an acquisition module, configured for acquiring 3D unordered point cloud data;
- a feature extraction module, configured for performing feature extraction and classification on the acquired point cloud data using a pre-trained parallel classification network, and obtaining an output result, wherein the parallel classification network is composed of a plurality of basic networks with the same structures; and
- a feature fusion module, configured for fusing the output results of the parallel network using a pre-trained deep Q network to obtain a final result of point cloud classification.

In a third aspect, the present disclosure provides a computing device, including a processor and a storage medium;
- the storage medium is configured for storing instructions; and
- the processor is configured for performing the steps of the method of the first aspect according to the instructions.

In a fourth aspect, the present disclosure provides a computer-readable storage medium storing a computer program. The program, when executed by a processor, realizes the steps of the method of the first aspect.

Compared with the prior art, beneficial effects achieved by the multiscale point cloud classification method provided by the embodiment of the present disclosure include:

The present disclosure acquires 3D unordered point cloud data, performs feature extraction and classification on the acquired point cloud data using a pre-trained parallel classification network, and obtaining an output result, wherein the parallel classification network is composed of a plurality of basic networks with the same structures. The present disclosure obtains features of different layers using the parallel classification network and fuses the features, including a local relationship between points, so that the feature extraction accuracy can be improved, and the accuracy and robustness of point cloud classification can be improved.

The present disclosure fuses the output results of the parallel network using a pre-trained deep Q network to obtain a final result of point cloud classification. The present disclosure fuses the output results of the parallel network on the basis of the deep Q network, so that the accuracy of a classification result can be improved.

DETAILED DESCRIPTION OF THE EMBODIMENTS

The present disclosure is further described below in combination with accompanying drawings. The following embodiment is only used to describe the technical solution of the present disclosure more clearly, and thus is only used as an example, but not intended to limit the protection scope of the present disclosure.

Embodiment I

An embodiment of the present disclosure provides a multiscale point cloud classification method, including:
- 3D unordered point cloud data is acquired;
- feature extraction and classification are performed on the acquired point cloud data using a pre-trained parallel classification network, and an output result is obtained, wherein the parallel classification network is composed of a plurality of basic networks with the same structures; and
- the output results of the parallel network are fused using a pre-trained deep Q network to obtain a final result of point cloud classification.

Specific steps are as follows:

Step 1: 3D unordered point cloud data to be classified is acquired.

A 3D unordered point cloud to be classified is expressed by $\{P_i | i=1, \ldots, n\}$, wherein each point $P_i$ is composed of three channels (x, y, z) and additional feature channels. Any one point cloud $\{P_i | i=1, \ldots, n\}$ is composed of n points in no specific order.

Although the points in the point cloud are unordered, they are from a space with a distance measure, so that the points still have a local structural relationship and a combination relationship of local structures.

After the 3D unordered point cloud to be classified is preprocessed by means of rotation and normalization, 1024 points are uniformly taken from each point cloud target for subsequent operations.

Step 2: feature extraction and classification are performed on the acquired point cloud data using a pre-trained parallel classification network, and an output result is obtained.

Figure 1:
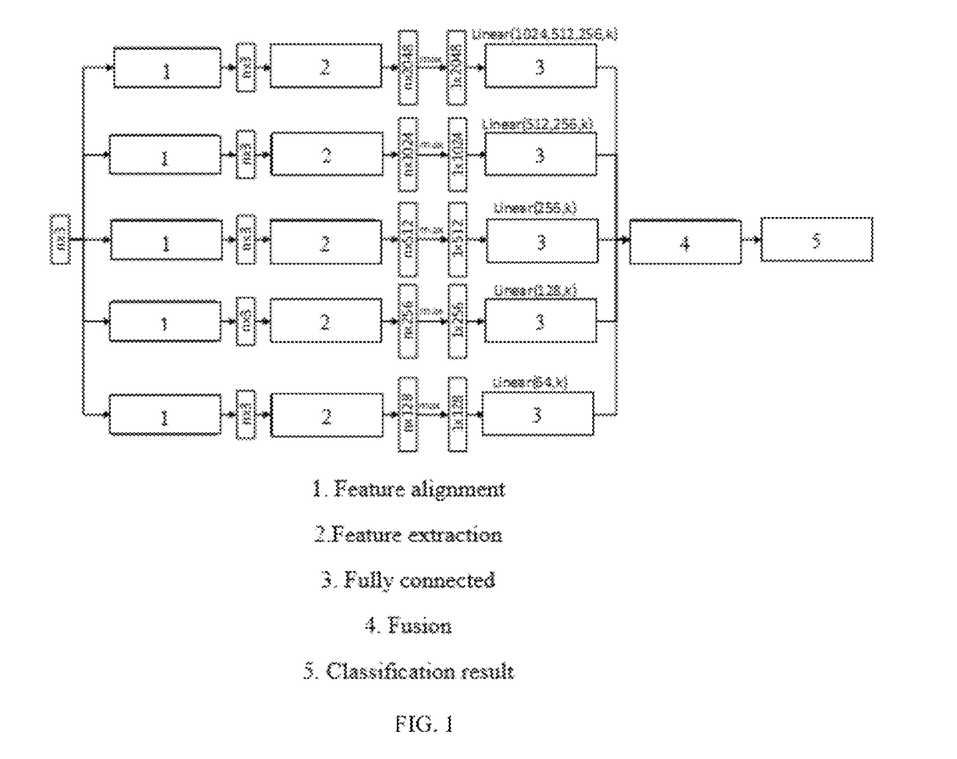
FIG. 1 is a network architecture of a parallel classification network of a multiscale point cloud classification method provided by Embodiment I of the present disclosure.

As shown in FIG. 1, the parallel classification network includes an input layer, and an output layer composed of five basic network with the same structures. Each basic network is distinguished according to different feature dimensions of point clouds input into the basic networks, and the dimensions of features output by different layers in the same basic network are the same.

Figure 2:
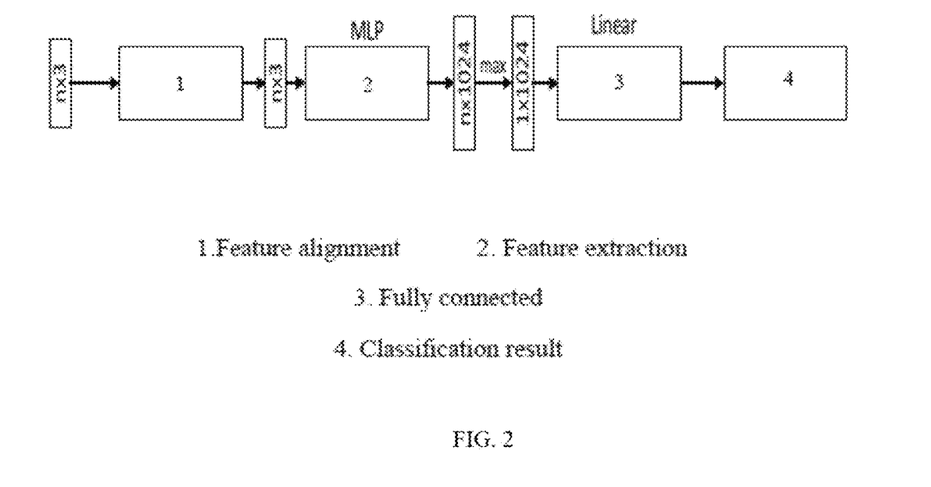
FIG. 2 is a network structure of basic networks of a multiscale point cloud classification method provided by Embodiment I of the present disclosure.

As shown in FIG. 2, each basic network includes a feature alignment layer, a feature extraction layer and a fully connected layer in sequence. The feature alignment layer is used for learning point cloud position features. The feature extraction layer is used for extracting global features. The fully connected layer is used for outputting results.

The input layer of the parallel classification network loads a preprocessed dataset, i.e. {$P_i$|i=1, ..., n}.

As shown in FIG. 1 and FIG. 2, the step that output results of the basic networks are obtained includes:

feature alignment is performed on the point clouds by means of the feature alignment layer according to point cloud data of n×3;

after a convolution operation is performed on the aligned point cloud data of n×3 for three times through the feature extraction layer, features with dimensions of n×128, n×256, n×512, n×1024 and n×2048 are output;

after max-pooling operation, a maximum value at the second dimension is solved, and global features with dimensions of 1×128, 1×256, 1×512, 1×1024 and 1×2048 are output; and processing is performed through the fully connected layer composed of a linear layer, and scores of k categories with a size of N×k is obtained as the output results of the basic networks, N being a batch size.

The results of five parallel classification networks are fused to obtain the output result of the pre-trained parallel classification network.

The structure of a feature pyramid network is a pyramid structure which is composed of low-level to high-level semantics and has high-level semantic features. A top-down building structure in the feature pyramid network samples features with lower dimensions to match features with higher dimensions, and then combines the futures by means of element adding. After repeated sampling and combination, a final feature map is generated.

The step that feature extraction is performed using the feature pyramid network by the feature extraction layer includes:

features are extracted according to an order from low dimensions to high dimensions; double upsampling and addition are performed on the extracted features in order from low dimensions to high dimensions; and features with corresponding feature dimensions are output.

Figure 3:
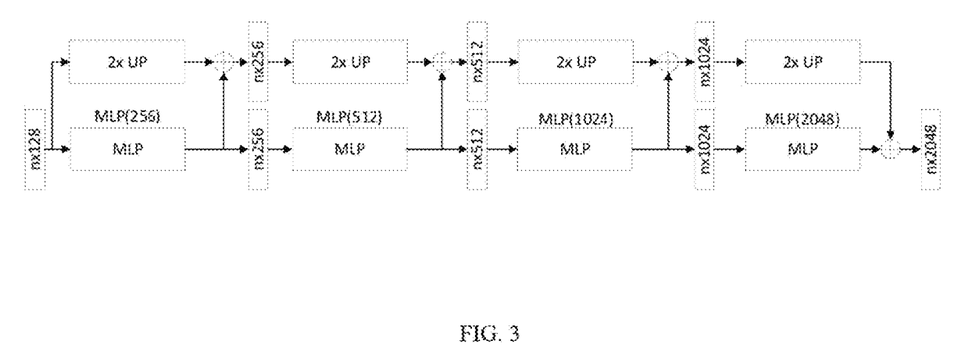
FIG. 3 is a schematic diagram of feature extraction in basic networks of a multiscale point cloud classification method provided by Embodiment I of the present disclosure.

Specifically, as shown in FIG. 3, the features from low dimensions to high dimensions are extracted in turn, with the sizes of n×256, n×512, n×1024 and n×2048. The double upsampling and addition are performed on the extracted features from low dimensions to high dimensions in turn to build the feature pyramid network composed of the features from low dimensions to high dimensions. This method adopts a top-down path. The features with low dimensions and high dimensions are gradually combined. This fusion process is repeated until a global feature with a size of n×2048 is generated.

As shown in FIG. 1, the features of all the dimensions adopt the shared fully connected layer, and fixed feature dimensions are adopted in all feature mappings. In this method, the matching fully connected layer is used for features with different dimensions to match features with dimensions of 128, 256, 512, 1024 and 2048, and corresponding classification results are output.

It should be noted that the present disclosure uses ModelNet40 training samples of Stanford University as a dataset, and uses a loss function for guidance to train the basic networks.

Specifically, there are 12311 point cloud targets in the dataset, including 9843 training set targets, 2468 test set targets, and 40 object categories. Each point cloud target used in training and testing is composed of 1024 points.

Specifically, the loss function adopted is introduced from negative logarithmic likelihood loss.

Assuming that there is a data distribution $P_{data}(x)$, a parameter θ and a data distribution model $P_G(x; θ)$ determined by θ, θ makes $P_G(x; θ)$ close to $P_{data}(x)$ as much as possible. m samples $x_1, x_2, \ldots x_3$ are collected from $P_{data}(x)$, and the data distribution model of each sample is calculated as $P_G(x; θ)$, so the likelihood function is defined as:

$$L = \prod_{i=1}^{m} P_G(x^i; θ) \quad (1)$$

Formula (2) can be obtained by taking logarithm of (1):

$$l(θ) = \sum_{i=1}^{m} \log(P_G(x^i; θ)) \quad (2)$$

Since logarithmic likelihood is to calculate a logarithm of a probability distribution, the value of a probability p(*) is a range of [0, 1], and the value is a range of (−∞, 0] after the logarithm is calculated. A minus sign is added in front of the range to obtain a range of [0, +∞), from which, formula (3) can be obtained:

Therefore, the negative logarithmic likelihood loss is defined as:

$$l(θ) = -\sum_{i=1}^{m} \log(P_G(x^i; θ)) \quad (3)$$

in formulas (1)-(3), $x^i$ represents a sample; m represents the number of training samples; and $P_G(x^i; θ)$ represents the data distribution model of each sample decided by parameter θ.

When the negative logarithmic likelihood loss is used, two tensors are required, i.e. two multidimensional arrays. One tensor is a prediction vector, i.e. the output result, and the other tensor is a label. The prediction vector is a one-dimensional tensor, the size of which is N×k. N is the number of point cloud targets in a batch; and k is a classification probability of each category. The size of the label is also N×k, which represents an index number of each category in the k categories of the N point cloud targets.

Step 3: the output results of the parallel network are fused using a pre-trained deep Q network to obtain a final result of point cloud classification.

A mainstream feature fusion method uses a convolutional neural network to achieve result selection. However, there is a bottleneck in the accuracy of the result selection of the convolutional neural network. In order to solve this defect, the present disclosure adopts the deep Q network to fuse the output results of the parallel network, and the deep Q network is used for solving the problem of the best policy in Q learning. After an environmental state is given, and a corresponding behavior is selected according to a certain policy and is then performed, the environmental state will change according to the behavior and become a new state. One excitation value will be obtained every time one new behavior is performed according to the policy. A corresponding program adjusts the performed policy according to the size of the obtained stimulation, so that when a final state and a termination state are achieved, the excitation value accumulated by performing the current policy is the maximum.

In the application scenario of the present disclosure, what the deep Q network needs to learn is a policy of selecting the best result in a parallel model. By manually marking the object categories with the best classification effect in each model, and training the deep Q network using the object categories serving as a dataset, the fusion effect is better than that of the convolutional neural network method.

For each state, the deep Q network only needs to perform one forward calculation, instead of performing forward calculations for the number of times that is proportional to the number of behaviors as the traditional neural network does. Thus, the problems of insufficient local attention to objects and difficult classification of complex objects and small objects are solved. Meanwhile, the robustness of the system is improved, and solve the problem of low overall classification accuracy caused by insufficient attention to local details of the point clouds.

A function is adopted to fit Q learning, i.e. Q(s, a; λ)≈Q*(s, a) where λ represents a model parameter, and fitting of a Q value is obtained through the end-to-end fitting of a deep neural network.

Embodiment II

This embodiment verifies the accuracy of the multiscale point cloud classification method provided by the present disclosure on the basis of the ModelNet40 dataset.

The results are divided into overall accuracy and classification accuracy. The overall accuracy is a ratio of the number of correctly predicted samples to the total number of samples. The average classification accuracy specifically refers to an average value of the classification accuracies of objects of each category among 40 object categories.

Comparison results of training the parallel classification network using the negative logarithmic likelihood loss function and codes of PointNet and PointNet++ are as shown in Table 1.

TABLE I

Average classification accuracy and overall classification accuracy

| Method | Average classification accuracy | Overall classification accuracy |
| --- | --- | --- |
| PointNet | 86.0 | 89.2 |
| PointNet++ | 87.30 | 90.7 |
| the present disclosure | 87.34 | 90.8 |

Meanwhile, the object classification accuracy of each category among the ModelNet40 categories is tested, and is compared with the object classification accuracy of PointNet and PointNet++. Object classification results are as shown in Table 2.

TABLE II

Object classification accuracy

| | Airplane | Bathtub | Cone | Dressing table | Glass box | Guitar | Desk lamp | Piano | Sofa |
| --- | --- | --- | --- | --- | --- | --- | --- | --- | --- |
| PointNet | 0.99 | 0.9101 | 0.8906 | 0.8055 | 0.9508 | 0.9665 | 0.8906 | 0.9040 | 0.9732 |
| PointNet++ | 1.0 | 0.9023 | 0.8906 | 0.7170 | 0.9486 | 0.9799 | 0.8906 | 0.9330 | 0.9732 |
| the present disclosure | 1.0 | 0.9218 | 0.9453 | 0.8263 | 0.9575 | 1.0 | 0.9453 | 0.9397 | 0.9821 |

Figure 4:
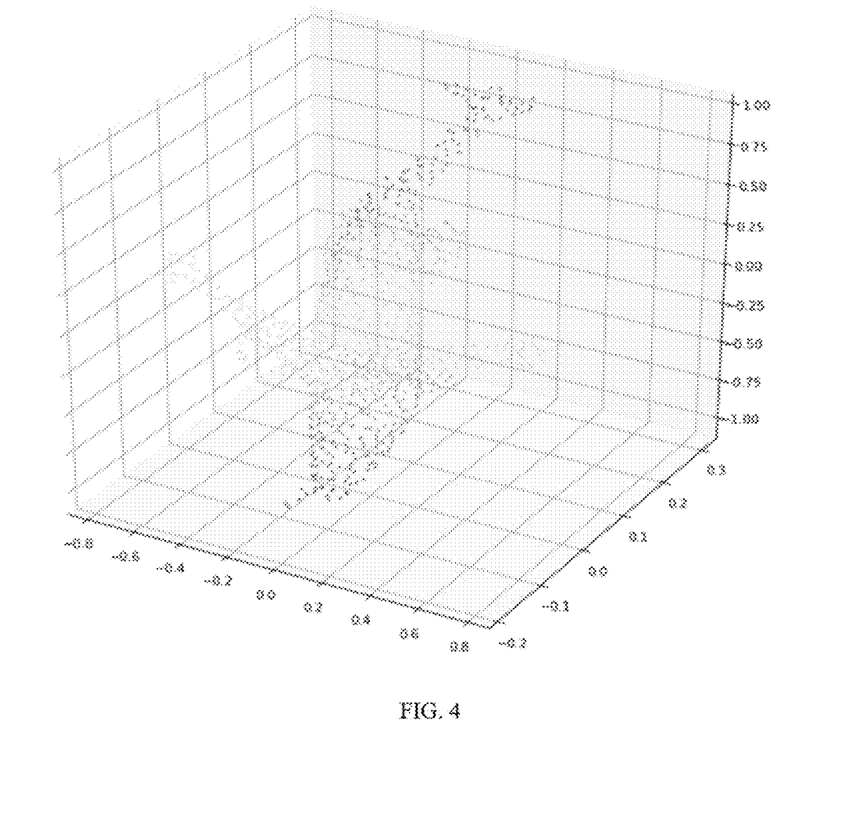
FIG. 4 is a 3D unordered point cloud target to be classified provided by Embodiment II of the present disclosure.

FIG. 4 shows a 3D unordered point cloud target to be classified, which is composed of 1024 points.

This embodiment designs hyper-parameters on the basis of Point Net and adjusts the hyper-parameters on the basis of actual situations. When the batch size is large, the convergence speed is high, but a too large batch size will lead to problems in generalization and consumption of a video memory. If the batch size is too small, it is difficult to achieve convergence in time. Therefore, the size of each batch in this embodiment is set to 64. The video memory of device 1080ti is 11 GB. When the size of each batch is set to 64, the consumption of the video memory is 10609 MB.

The negative logarithmic likelihood loss function is used to train the parallel classification network. The learning rate is set to 0.001, and the learning rate is optimized on the basis of a callback function. The accuracy of the test set is a specific monitoring indicator. The number of attenuation waiting iterations is set to 7, and the attenuation rate is set to 0.7. When the tracking accuracy is not improved for seven consecutive iterations, the learning rate will change. In this embodiment, iterative training is planned to be performed for 120 times. A reference indicator of model saving is the accuracy of the test set. The model will be saved only when the accuracy of the test set is higher than the highest accuracy of the test set.

The classification accuracies of the cone, the guitar, the desk lamp and the piano have been significantly improved, while the classification accuracies of the airplane, the bathtub, the dressing table, the glass box and the sofa have been less improved. The classification results show that the network has achieved good performance, and the results have improved significantly.

Figure 5:
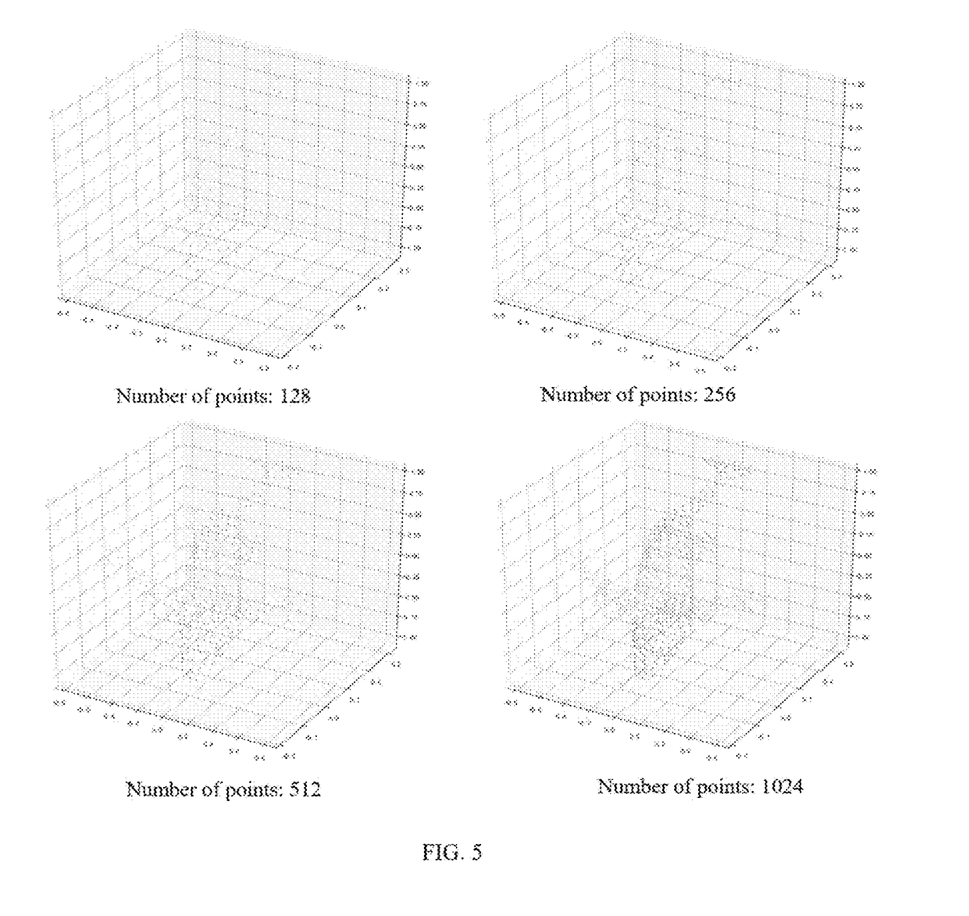
FIG. 5 is point cloud targets including 128, 256, 512, and 1024 points provided by Embodiment II of the present disclosure.

A sparsity experiment is performed on the network designed by the present disclosure and PointNet, as well as PointNet++, to compare the robustness. As shown in FIG. 5, the number of points included in a single point cloud target is 1024, 512, 256, and 128. The recognition degree of a point cloud set composed of different numbers of sampling points decreases with the decrease of the number of sampling points.

Figure 6:
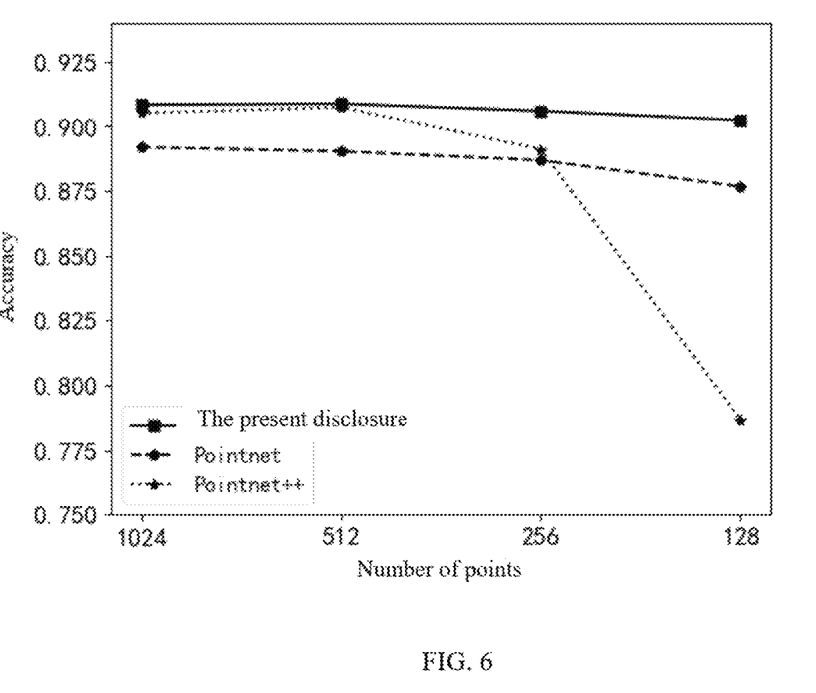
FIG. 6 is general classification accuracy of point clouds including 1024, 512, 256, and 128 points provided by Embodiment II of the present disclosure.
Figure 7:
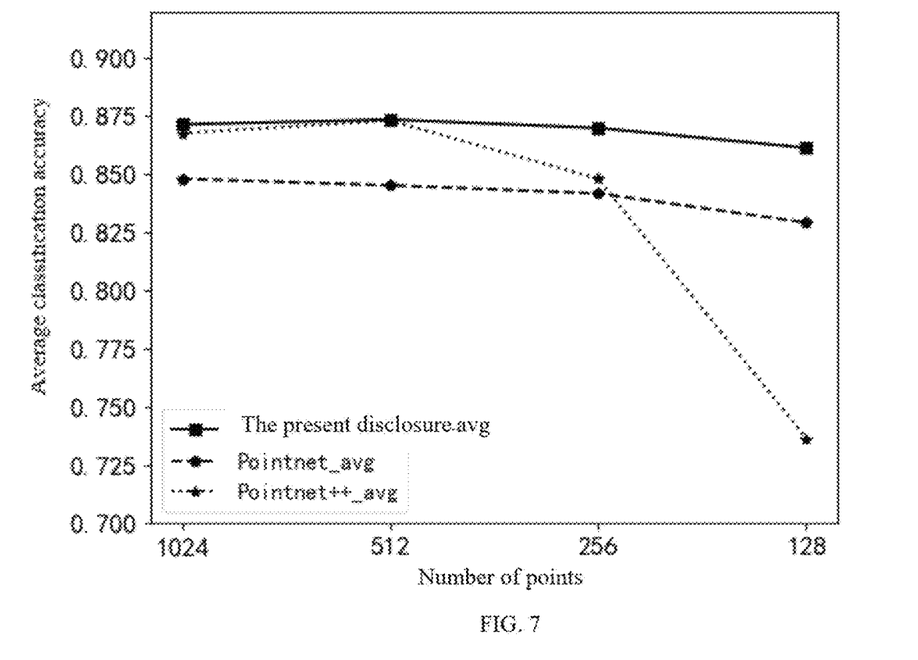
FIG. 7 is average classification accuracy of point clouds including 1024, 512, 256, and 128 points provided by Embodiment H of the present disclosure.

The overall classification accuracy of the multiscale point cloud classification method provided by the present disclosure under the above different numbers of points is as shown in FIG. 6, and the average classification accuracy is as shown in FIG. 7. When the number of points constituting the point cloud target is 1024, the overall classification accuracies of the multiscale point cloud classification method provided by the present disclosure, PointNet and PointNet++ are 0.90834, 0.89191 and 0.90513 respectively, and the average classification accuracies are 0.87132, 0.84801 and 0.86758 respectively. When the number of selected points decreases to 128, the overall classification accuracies of the multiscale point cloud classification method provided by the present disclosure, PointNet and PointNet++ ar 0.90233, 0.87669 and 0.78663 respectively, and the average classification accuracies are 0.86130, 0.82923 and 0.73670 respectively. When the number decreases from 1024 to 128, the overall accuracy and average accuracy of the multiscale point cloud classification method provided by the present disclosure are decreased by 0.006 and 0.01 respectively, the overall accuracy and average accuracy of PointNet are decreased by 0.0153 and 0.019 respectively, and the overall accuracy and average accuracy of PointNet++ are decreased by 0.1185 and 0.13088 respectively. Since a local sampling mechanism is adopted in PointNet++, the network has a high requirement for the number of points in the point cloud set. When the number of points decreases rapidly, the accuracy will be rapidly reduced. Compared with PointNet, the network designed by the present disclosure can select results for objects with different sizes, so it also has more advantages than PointNet in the robustness test.

Embodiment III

An embodiment of the present disclosure provides a multiscale point cloud classification system, including:
an acquisition module, configured for acquiring 3D unordered point cloud data;
a feature extraction module, configured for performing feature extraction and classification on the acquired point cloud data using a pre-trained parallel classification network, and obtaining an output result, wherein the parallel classification network includes a plurality of basic networks with the same structures; and
a feature fusion module, configured for fusing the output results of the parallel network using a pre-trained deep Q network to obtain a final result of point cloud classification.

Embodiment IV

An embodiment of the present disclosure provides a computing device, including a processor and a storage medium.
The storage medium is configured for storing instructions.
The processor is configured for performing the steps of the method of Embodiment I according to the instructions.

Embodiment V

An embodiment of the present disclosure provides a computer-readable storage medium storing a computer program. The program implements the steps of the methods in Embodiment I when executed by a processor.

Those skilled in the art should understand that the embodiments of the present application may be methods, systems or computer program products. Therefore, the present application may adopt the form of a complete hardware embodiment, a complete software embodiment, or a software and hardware combination embodiment. In addition, the present application may adopt the form of a computer program product implemented on one or multiple computer-sensitive storage media (including, but not limited to, a magnetic disk memory, a compact disc read-only memory (CD-ROM), an optical memory and the like) including computer-sensitive program codes.

The present disclosure is described by referring to flowcharts and/or block diagrams of methods, devices (systems) and computer program products according to the embodiments of the present application. It is worthwhile to note that computer program instructions can be used to implement each flow and/or each block in the flowcharts and/or the block diagrams and a combination of a flow and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

Alternatively, these computer program instructions can be stored in a computer-readable memory that can instruct the computer or the another programmable data processing device to work in a specific way, so that the instructions stored in the computer-readable memory generate an artifact that includes an instruction apparatus. The instruction apparatus implements a specified function in one or more processes in the flowcharts and/or in one or more blocks in the block diagrams.

Alternatively, these computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

The above is only the preferred implementation modes of the present disclosure. It should be noted that those of ordinary skill in the art can further make several improvements and transformations without departing from the technical principles of the present disclosure. These improvements and transformations shall all fall within the protection scope of the present disclosure.

What is claimed is:
1. A multiscale point cloud classification method, applied on recognition of an object in three-dimensional (3D) space, comprising:
acquiring 3D unordered point cloud data;
performing feature extraction and classification on the acquired point cloud data using a pre-trained parallel classification network, and obtaining an output result, wherein the parallel classification network comprises an input layer, and an output layer composed of five basic networks with the same structures, wherein the various basic networks are distinguished according to different feature dimensions of point clouds input into the basic networks, and the dimensions of features output by different layers in the same basic network are the same; wherein each basic network includes a feature alignment layer, a feature extraction layer and a fully connected layer in sequence; the feature alignment layer is used for learning point cloud position features; the feature extraction layer is used for extracting global features; the fully connected layer is used for outputting results; and fusing the output results of the parallel network using a pre-trained deep Q network to obtain a final result of point cloud classification, to determine various objects in the 3D space.

2. The multiscale point cloud classification method according to claim 1, wherein the obtaining an output result comprises:
performing feature alignment on the point clouds by means of the feature alignment layer according to point cloud data of n×3;
after a convolution operation is performed on the aligned point cloud data of n×3 for three times through the feature extraction layer, outputting features with dimensions of n×128, n×256, n×512, n×1024 and n×2048;
after max-pooling operation, solving a maximum value at the second dimension, and outputting global features with dimensions of 1×128, 1×256, 1×512, 1×1024 and 1×2048; and
performing processing through the fully connected layer, and obtaining scores of k categories with a size of N×k as the output results of the basic networks, N being a batch size.

3. The multiscale point cloud classification method according to claim 1, wherein the performing, by the feature extraction layer, feature extraction using a feature pyramid network comprises:
extracting features according to an order from low dimensions to high dimensions, performing double upsampling and addition on the extracted features in order from low dimensions to high dimensions, and outputting features with corresponding feature dimensions.

4. The multiscale point cloud classification method according to claim 1, wherein the various basic networks that constitute the parallel network are trained using a loss function, and the loss function is expressed by the following formula:

$$l(\theta) = -\sum_{i=1}^{m} \log(P_G(x^i; \theta)) \quad (1)$$

in formula (1), xi represents a sample; m represents the number of training samples; and PG (xi; θ) represents a data distribution model of each sample decided by parameter θ.

5. The multiscale point cloud classification method according to claim 1, wherein a dataset for training the deep Q network is an object category with the best classification result achieved by manually labeling each basic model.

6. A computing device, comprising a processor and a storage medium, wherein the storage medium is configured for storing instructions; and
the processor is configured for performing, according to the instructions, the steps of the method according to claim 1.

* * * * *